(12) United States Patent
Johansson

(10) Patent No.: US 6,792,052 B1
(45) Date of Patent: Sep. 14, 2004

(54) JOINT LEAST-SQUARE SYNCHRONIZATION, CHANNEL ESTIMATION AND NOISE ESTIMATION

(75) Inventor: Ingemar Johansson, Karlstad (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 718 days.

(21) Appl. No.: 09/717,067

(22) Filed: Nov. 22, 2000

(51) Int. Cl.[7] .............................................. H04L 27/06

(52) U.S. Cl. ...................................... 375/340; 375/354

(58) Field of Search ................................ 375/354, 355, 375/224, 227, 285, 346, 347, 340, 341; 370/503

(56) References Cited

U.S. PATENT DOCUMENTS

| | | | | |
|---|---|---|---|---|
| 4,385,393 A | * | 5/1983 | Chaure et al. | ............... 375/249 |
| 5,231,648 A | * | 7/1993 | Driedger et al. | ............ 375/231 |
| 5,373,507 A | | 12/1994 | Sköold | |
| 5,875,215 A | | 2/1999 | Dobrica | |
| 6,108,517 A | | 8/2000 | Arslan et al. | |

FOREIGN PATENT DOCUMENTS

WO WO01/61950 8/2001

* cited by examiner

Primary Examiner—Don N. Vo

(57) ABSTRACT

A method and apparatus for acquiring time synchronization, as well as a channel estimate and a noise estimate for a received signal are described. First, a burst of data which includes a training sequence is received. Then, groups of received training sequence measurements are created. For each of these groups, a set of linear equations is set up. Next, methods according to the present invention determine the least square estimate by solving the matrix equation $H=(A^TA)^{-1}*A^TL$ for each of the groups. This least square estimate is performed in several steps which reduce the number of calculations to be performed. The term $A^TA$ is the same for each group and can be computed once prior to computing the least square estimates. The $A^TL$ terms are calculated separately for each group. In the process of calculating the $A^TL$ term for each group, the $A^TL$ term calculated for the previous group can be reused to reduce the total number of calculations. Once the $A^TA$ and $A^TL$ terms are calculated, then the least square estimate for each group is determined. The least square estimate is then used to determine a noise estimate for each group. Again, mechanisms for reuse of certain calculations associated with the determination of the noise estimate that reduces the computational complexity associated therewith. Once the noise estimate is calculated for each group, the method determines which of the groups has the lowest valued noise estimate. That group, according to one exemplary embodiment, is chosen as the synchronization group. As an alternative, the group which has the greatest estimated signal-to-noise ratio can be selected as the synchronization group in this step. The least square estimate of the synchronization group is then identified as the channel estimate.

19 Claims, 3 Drawing Sheets

JOINT LEAST-SQUARE SYNCHRONIZATION, CHANNEL ESTIMATION AND NOISE ESTIMATION

BACKGROUND

The field of the invention relates to synchronization of signals and, in particular, to a method of jointly performing synchronization, channel estimation and noise estimation using a least squares estimation method, e.g., in a radio-communication system.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

In mobile communication, the transmitted signal is often subjected to a time smearing effect created by the time dispersive nature of the channel, i.e., the air interface between a base station and a mobile station. The channel effects are estimated in the receiver part of a communication system, and used by the detector to aid in attempting to correctly deduce the information symbols that were transmitted thereto.

In a digital cellular system, "symbols" are sent out from a transmitter, e.g. a mobile phone. A symbol in this case, e.g., systems as defined by the Global System for Mobile Communications (GSM) or Enhanced Data Rates for Global Evolution (EDGE), can be seen as a complex-valued number, where the information resides in the phase angle. GSM has defined 1 bit symbols with possible phase angles of 0 and $\pi$ radians. EDGE has defined 3 bit symbols, with possible phase angles of 0, $\pi/4$, $\pi/2$, $3\pi/4$, $\pi$, $5\pi/4$, $3\pi/2$ and $7\pi/4$ radians, respectively.

When sending a symbol, a pulse-shaped waveform is transmitted in the air. The symbol rate in both GSM and EDGE systems is 270,833 symbols per second, therefore, new symbol "pulses" will be created by the transmitter each 3.7 $\mu$s. A transmitted symbol pulse is split into several rays during its travel though the air which phenomena is referred to as multi-path propagation. Different rays typically travel along different paths on their way between transmitter and receiver antennas. Examples of items that cause multi-path distortion are reflections because of hills, buildings, vehicles etc. On the receiving side (e.g. a base station), the symbols will be detected thru complex-valued measurements of the received rays.

As an extreme example, e.g., in hilly terrain, consider that a specific symbol is smeared over 30 $\mu$s, i.e., about eight times the original symbol period. To reconstruct such symbols the receiver can make measurements, Y(i), which contain a weighted sum of 8 transmitted symbols, S(i–k):

$Y(i)=\Sigma H(k)*S(i-k); k=0$ to 7;

wherein H(k) are the channel taps (complex-valued). Such a radio channel is often briefly referred to as an "8 tap channel."

In order to time tune ("synchronize") a receiver to a burst of received symbols, the position of a known data pattern within the burst is determined. In GSM systems, this pattern is referred to as a training sequence and is defined to be in the middle of each burst or timeslot. Normal Bursts (NB) in both GSM and EDGE contain a training sequence of 26 symbols as illustrated in FIG. 1, which symbols are complex-valued.

A primary issue confronting systems designers dealing with synchronization issues is determining, for example with respect to GSM systems and terminals, which group of 26 measurements performed on a received data burst at the receiver corresponds "best" to the 26 training sequence symbols. A conventional GSM synchronization system, which is described in U.S. Pat. No. 5,373,507 (the disclosure of which is incorporated here by reference), addressed this challenge as follows.

After receiving a burst of data, the receiver processes it in a number of different steps to acquire synchronization. In a first step, the center of energy of a first vector, having e.g., M correlation values between a synchronization sequence and M parts of a signal frame, which are partially overlapping and mutually displaced by one sampling interval, is calculated. For example, by taking five consecutive correlation values to form a first vector and then shifting attention to the next five consecutive sampling values, two vectors are obtained with partially the same elements which are time displaced by one sampling interval. FIG. 2 depicts a correlation-time diagram in which the sampling instances n run along the X-axis and the squared magnitudes of the correlations between the locally generated training sequence and the received signal run along the Y-axis. The center of energy w is calculated in accordance with the formula:

$$w = \frac{\sum_{k=0}^{M-1} k|c(k)|^2}{\sum_{k=0}^{M-1} |c(k)|^2}$$

where M is the number of correlation values e.g., 11. The obtained value is rounded to a preliminary window position m, by rounding the obtained value w to the nearest integer.

In a second step the receiver in the '507 patent determines the energy of the correlation values c(n) that are contained in two windows around this preliminary central window position in accordance with the formula:

$$E_n = \sum_{j=-K}^{K} |c(j+m_w+n)|^2 \qquad n=0,1$$

where 2K+1=N, that is the number of correlation values in each window, for example, 5. In the example illustrated in FIG. 2 applying this technique will result in w being close to 3, the preliminary window center position will be rounded to 3, and two windows centered around positions 3 and 4 are compared with respect to energy contents. The coefficients c(n) of the window that has the largest energy content is output to the equalizer as a channel estimate. The final synchronization position m can be decided in several ways, e.g., by selecting the center position of the window with the largest energy content.

During the introduction of EDGE, an 8 tap channel has been proposed, in order to be able to handle Typical Urban (TU) as well as Hilly Terrain (HT) channels. With the number of channel taps extended from 5 to 8, to employ the method described in U.S. Pat. No. 5,373,507, it will be necessary to calculate 14 correlation products, in order to continue to provide 7 possible synchronization positions. This in turn, would require a center-of-weight search over 14 squared length correlation products. Although, from a purely computational point of view, it may be possible to extend the technique described in U.S. Pat. No. 5,373,507 to perform a center-of-weight search over 14 squared length correlation products, simulations have indicated that some of the additional squared length correlation products which are required by this technique become disturbed by the bits outside of the training sequence. Thus, it would be desirable to perform synchronization in a manner which avoids these disturbances.

One approach is to use a least square error technique instead of the autocorrelation techniques described in U.S. Pat. No. 5,373,507. In general, the least square error technique involves solving the matrix equation $H=(A^TA)^{-1}*A^TL$, where A is an observation matrix, H is a channel estimate vector and L is a receiver measurement vector. More details regarding this equation and the least square technique are provided below.

Although this least square technique provides an improved result as compared with the autocorrelation technique described above, it does so at the expense of additional processing resources since the number of computations involved in a straightforward application of the least square technique is significantly greater than that associated with the conventional autocorrelation technique. Moreover, since channel estimation and noise estimation must still be performed independently, the total number of computations associated with synchronization, channel estimation and noise estimation requires an unacceptable percentage of the available processing resources.

Accordingly, it would be desirable to arrive at techniques which provide for accurate synchronization in developing radiocommunication systems that employ higher order modulations, while using an acceptable portion of the available processing resources.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The present invention includes a method and apparatus for acquiring time synchronization, as well as a channel estimate and a noise estimate for a received signal. First, a burst of data which includes a training sequence is received. Then, groups of received training sequence measurements are created. According to an exemplary embodiment seven groups, each containing 19 measurements are created. For each of these groups, a set of linear equations is set up. Next, methods according to the present invention determine the least square estimate by solving the matrix equation $H=(A^TA)^{-1}*A^TL$ for each of the groups.

According to exemplary embodiments of the present invention, this least square estimate is performed in several steps which reduce the number of calculations to be performed. The term $A^TA$ is the same for each group and can be computed once prior to computing the least square estimates. The $A^TL$ terms are calculated separately for each group. In the process of calculating the $A^TL$ term for each group, the $A^TL$ term calculated for the previous group can be reused to reduce the total number of calculations. Once the $A^TA$ and $A^TL$ terms are calculated, then the least square estimate for each group is determined.

The least square estimate is then used to determine a noise estimate for each group. Again, exemplary embodiments of the present invention provide mechanisms for reuse of certain calculations associated with the determination of the noise estimate that reduces the computational complexity associated therewith. Once the noise estimate is calculated for each group, the method determines which of the groups has the lowest valued noise estimate. That group, according to one exemplary embodiment, is chosen as the synchronization group. As an alternative, the group which has the greatest estimated signal-to-noise ratio can be selected as the synchronization group in this step. The least square estimate of the synchronization group is then identified as the channel estimate.

The above features and advantages of the present invention will be more apparent and additional features and advantages of the present invention will be appreciated from the following detailed description of the invention made with reference to the drawings.

BRIEF DESCRIPTION OF THE DRAWINGS

The present invention will now be described with reference to the following figures, in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are based upon the time division multiple access ("TDMA") protocol, in which communication between the base station and the mobile terminals is performed over a number of time slots. However, those skilled in the art will appreciate that the concepts disclosed herein find use in other protocols, including, but not limited to, frequency division multiple access ("FDMA"), code division multiple access ("CDMA"), or some hybrid of any of the above protocols. Likewise, some of the exemplary embodiments provide illustrative examples relating to GSM types of radiocommunication systems; however, the techniques described herein are equally applicable to radio communication systems operating in accordance with any specification.

Figures 1, 2:
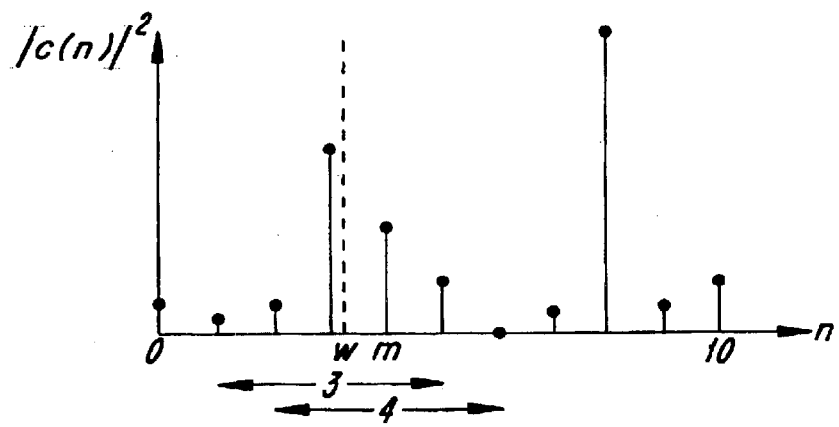
FIG. 1 depicts a GSM timeslot burst format.
FIG. 2 is a correlation-time diagram of a conventional method for determining a synchronization group and a channel estimate.
Figure 3:
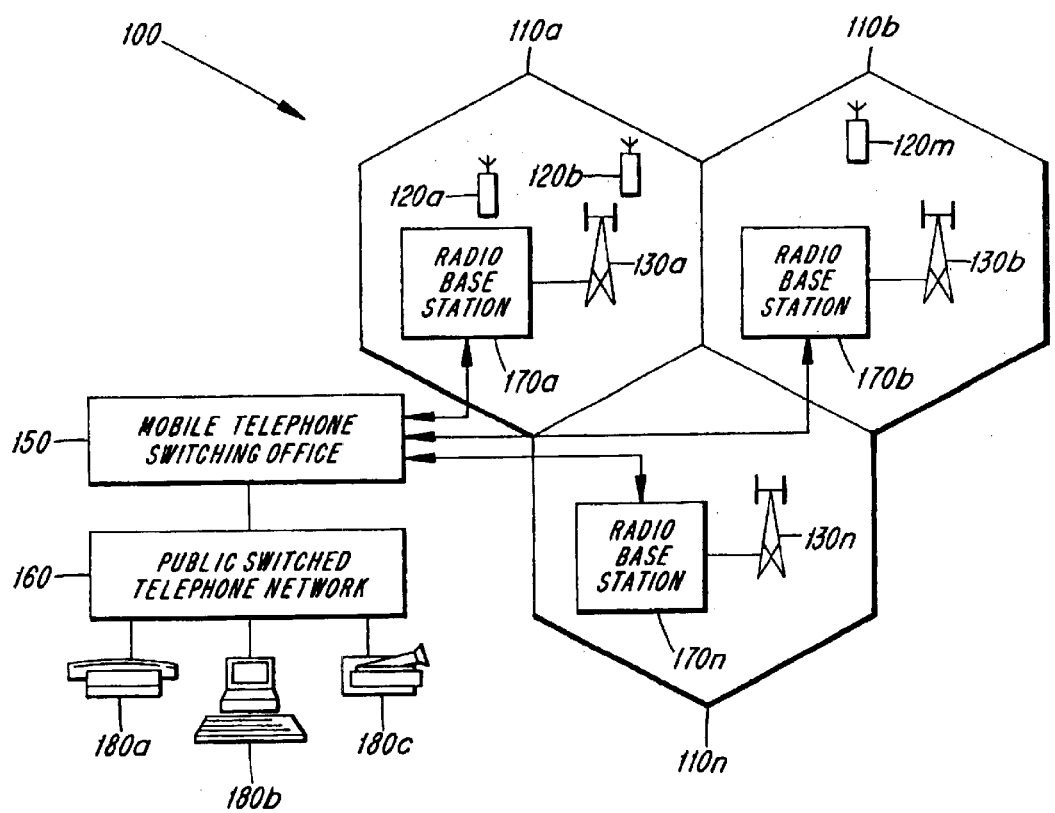
FIG. 3 illustrates a radiocommunication system in which the present invention can be implemented and FIG. 4 is a flowchart depicting an exemplary method for synchronization according to the present invention.

FIG. 3 is a block diagram of a general cellular radio communication system in which an embodiment of the invention may be practiced. The radio communication system 100 of FIG. 3 includes a plurality of radio base stations 170a–n connected to a plurality of corresponding antennas 130a–n. The radio base stations 170a–n in conjunction with the antennas 130a–n communicate with a plurality of mobile terminals (e.g. terminals 120a, 120b, and 120m) within a plurality of cells 110a–n. Communication from a base station to a mobile terminal is referred to as the downlink, whereas communication from a mobile terminal to the base station is referred to as the uplink.

The base stations are connected to a mobile switching center ("MSC") 150. Among other tasks, the MSC coordinates the activities of the base station, such as during the handoff of a mobile terminal from one cell to another. The MSC, in turn, can be connected to a public switched telephone network 160, which services various communication devices 180a, 180b, and 180c. Both the mobile terminals 120a, 120b, and 120m, and the base stations 170a–n can incorporate joint synchronization, channel estimation and noise estimation structures and techniques according to the present invention.

As a basis for discussing exemplary embodiments of the present invention, several assumptions and references will be employed, however these are purely illustrative in nature. First, since the GSM specification will be used as an example, the exemplary algorithms described herein will be based on training sequences having a length of 26 symbols. These symbols are exclusively −1 or +1 in value, i.e., they are real-valued, and will be referenced throughout this specification as U0 . . . U25. Of course, those skilled in the art will appreciate that training sequences of different lengths can be used in conjunction with the present invention.

Secondly, for these examples, it will be assumed that the channel conditions to be accommodated and performance standards to be met, e.g., requisite time dispersion, dictate that eight channel taps be used. These will be denoted H0 . . . H7. Thirdly, for these examples 25 complex valued measurements will be performed per timeslot and these will be denoted Y0 . . . Y24. Again, those skilled in the art will appreciate that more or fewer than eight channel taps can be used and that the number of channel measurements can vary as well.

As discussed in the Background, time synchronization in GSM/EDGE systems entails determining which 26-group of measurements "best" corresponds to the 26 training sequence symbols. If there is an eight tap channel, the first seven of these measurements in the group of 26 might be influenced by symbols outside the training sequence. Therefore, during synchronization, exemplary methods for determining a synchronization position according to the present invention use only the best group of 19 measurements which corresponds to the last 19 training sequence symbols, i.e. U7 . . . U25.

It is assumed that the 19 measurements, Y0–Y18, correspond to the transmitted training symbols U7 . . . U25. The following linear equations are then established:

$Y0=\Sigma(H(k)*U(7-k)); k=0 \ldots 7;$ $Y1=\Sigma(H(k)*U(8-k)); k=0 \ldots 7;$ $Y2=\Sigma(H(k)*U(9-k)); k=0 \ldots 7;$ $Y3=\Sigma(H(k)*U(10-k)); k=0 \ldots 7;$ $Y4=\Sigma(H(k)*U(11-k)); k=0 \ldots 7;$ $Y5=\Sigma(H(k)*U(12-k)); k=0 \ldots 7;$ $Y6=\Sigma(H(k)*U(13-k)); k=0 \ldots 7;$ $Y7=\Sigma(H(k)*U(14-k)); k=0 \ldots 7;$ $Y8=\Sigma(H(k)*U(15-k)); k=0 \ldots 7;$ $Y9=\Sigma(H(k)*U(16-k)); k=0 \ldots 7;$ $Y10=\Sigma(H(k)*U(17-k)); k=0 \ldots 7;$ $Y11=\Sigma(H(k)*U(18-k)); k=0 \ldots 7;$ $Y12=\Sigma(H(k)*U(19-k)); k=0 \ldots 7;$ $Y13=\Sigma(H(k)*U(20-k)); k=0 \ldots 7;$ $Y14=\Sigma(H(k)*U(21-k)); k=0 \ldots 7;$ $Y15=\Sigma(H(k)*U(22-k)); k=0 \ldots 7;$ $Y16=\Sigma(H(k)*U(23-k)); k=0 \ldots 7;$ $Y17=\Sigma(H(k)*U(24-k)); k=0 \ldots 7;$ $Y18=\Sigma(H(k)*U(25-k)); k=0 \ldots 7;$ The foregoing establishes a system of 19 linear equations, with eight unknowns, H(0 . . . 7). This can be re-written in matrix form:

$$L=A*H$$

where:

A is referred to herein as the observation matrix. A is a 19*8 (rows, columns) matrix with A(i,k)=U(7+i−k), for i=0 . . . 18, k=0 . . . 7.

H are the channel taps. An estimate of the channel taps, is often called the "channel estimate." In this example, H is a column vector of 8 elements, H(k), for k=0 . . . 7.

L are receiver measurements. In this example, L is a column vector of 19 elements, L=Y(0 . . . 18).

(Note that the "*" indicates a matrix multiplication operation).

The equation L=A*H is a set of linear equations, which contains more equations than unknowns. It is therefore not possible to solve the equations for the unknowns directly. There is a method however which provides solutions for the unknowns, referred to as the least squares estimate (LSE) technique. The LSE solution is given by:

$$H=(A^TA)^{-1}*(A^TL);$$

where, $A^T$=the transpose of the A matrix. Therefore, H is equal to the reciprocal of the transpose of matrix A($A^T$) times matrix A; multiplied with the product of the transpose of matrix A($A^T$) and matrix L. As mentioned above, one problem with employing this technique to the problem of time synchronization is its computational complexity.

Figure 4:
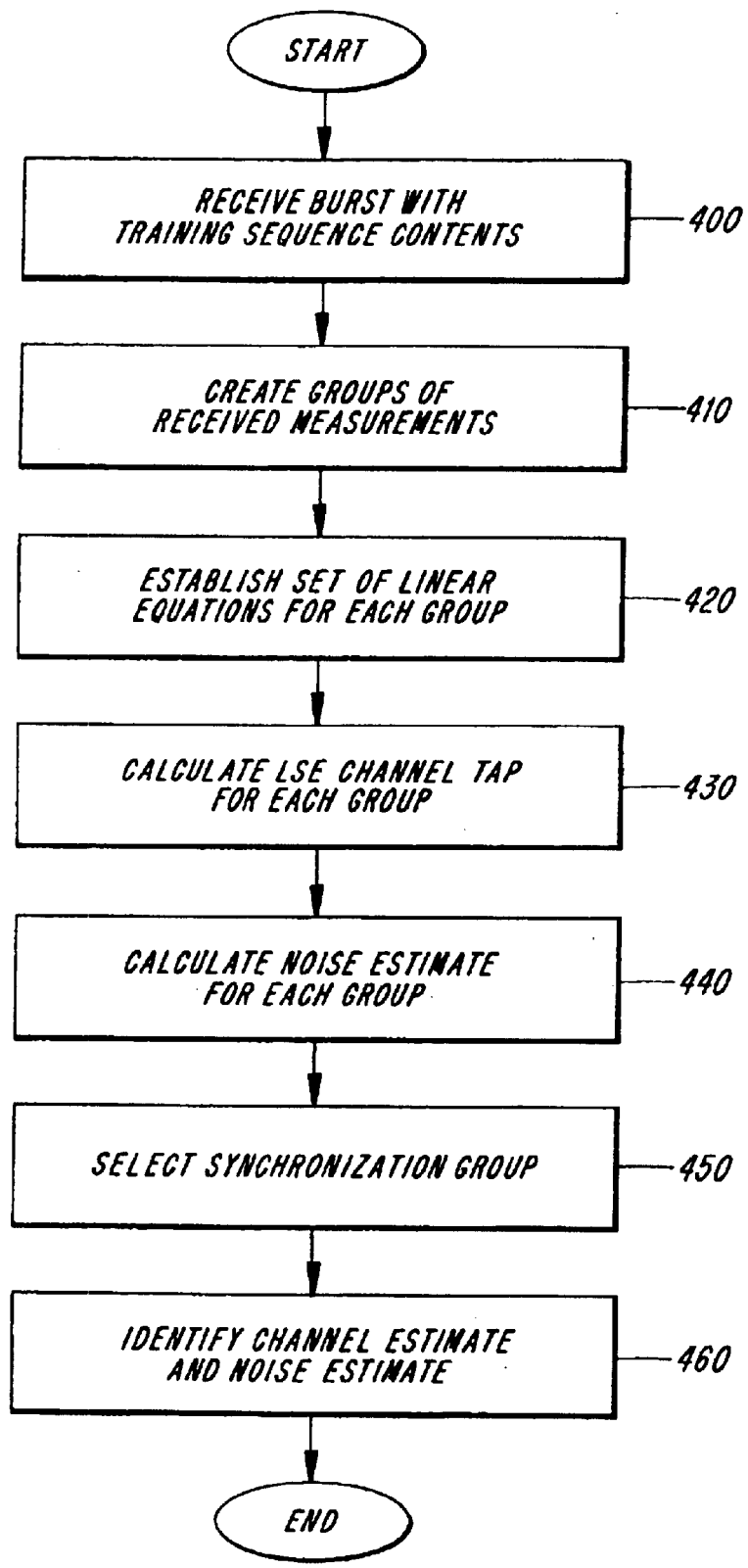

An overview of methods for joint synchronization, channel estimation and noise estimation according to the present invention is illustrated in FIG. 4 and begins with the step 400 of receiving a burst of data which includes a training sequence. Next, at step 410 groups of received training sequence measurements are created. In this example seven groups, each containing 19 measurements are created, i.e.:

1/Y(0 . . . 18)
2/Y(1 . . . 19)
3/Y(2 . . . 20)
4/Y(3 . . . 21)
5/Y(4 . . . 22)
6/Y(5 . . . 23)
7/Y(6 . . . 24)

For each of these groups, a set of linear equations is created at step 420 (i.e., in a manner similar to that shown for Y0 . . . Y18 above). Next, at step 430, the method determines the least square estimate of H for each of the seven groups. This will be referred to herein as the LSE channel estimate.

The LSE channel estimate is then used in the next step 440. Therein, the summed squared differences between the left and right membrums of the equation:

$$L = A*H$$

are calculated (the left membrum is L and the right membrum is A*H). This operation is performed for each of the seven groups to generate values which are also referred to herein as the noise estimates. As a next step 450, the method determines which of the seven groups has the lowest valued noise estimate. That group, according to this exemplary embodiment, is chosen as the synchronization group. As an alternative, the group which has the greatest estimated signal-to-noise ratio can be selected as the synchronization group in this step. The LSE channel estimate of the synchronization group is then identified as the channel estimate at step 460.

This exemplary method of jointly determining a synchronization position group, a channel estimate and a noise estimate will now be discussed in more detail, in particular highlighting techniques by way of which Applicant has reduced the computational complexity associated with steps 430 and 440 described above. As mentioned above, initially groups of sequential symbols are created, each of which are associated with a potential synchronization position in this example seven groups numbered 1 to 7. Each group is derived from the following formula:

$$Y(g+i-1) = \Sigma(H(k)*U(7+i-k)); \quad k=0 \ldots 7; \quad i=0 \ldots 18; \quad g=1 \ldots 7; \quad \text{group g(Grg):}$$

This yields seven groups of 19 sequential measurements each. As mentioned above, in matrix form the system of 19 linear equations with 8 unknowns (H(0 . . . 7)) is written as L=A*H. For group 1, the expression for the received symbols is as follows:

$$Y(i) = \Sigma(H(k)*U(7+i-k)); \quad k=0 \ldots 7; \quad i=0 \ldots 18.$$

Written in long form, these equations are as follows:

$Y0 := H0*U7 + H1*U6 + H2*U5 + H3*U4 + H4*U3 + H5*U2 + H6*U1 + H7*U0$ $Y1 := H0*U8 + H1*U7 + H2*U6 + H3*U5 + H4*U4 + H5*U3 + H6*U2 + H7*U1$ $Y2 := H0*U9 + H1*U8 + H2*U7 + H3*U6 + H4*U5 + H5*U4 + H6*U3 + H7*U2$ $Y3 := H0*U10 + H1*U9 + H2*U8 + H3*U7 + H4*U6 + H5*U5 + H6*U4 + H7*U3$ $Y4 := H0*U11 + H1*U10 + H2*U9 + H3*U8 + H4*U7 + H5*U6 + H6*U5 + H7*U4$ $Y5 := H0*U12 + H1*U11 + H2*U10 + H3*U9 + H4*U8 + H5*U7 + H6*U6 + H7*U5$ $Y6 := H0*U13 + H1*U12 + H2*U11 + H3*U10 + H4*U9 + H5*U8 + H6*U7 + H7*U6$ $Y7 := H0*U14 + H1*U13 + H2*U12 + H3*U11 + H4*U10 + H5*U9 + H6*U8 + H7*U7$ $Y8 := H0*U15 + H1*U14 + H2*U13 + H3*U12 + H4*U11 + H5*U10 + H6*U9 + H7*U8$ $Y9 := H0*U16 + H1*U15 + H2*U14 + H3*U13 + H4*U12 + H5*U11 + H6*U10 + H7*U9$ $Y10 := H0*U17 + H1*U16 + H2*U15 + H3*U14 + H4*U13 + H5*U12 + H6*U11 + H7*U10$ $Y11 := H0*U18 + H1*U17 + H2*U16 + H3*U15 + H4*U14 + H5*U13 + H6*U12 + H7*U11$ $Y12 := H0*U19 + H1*U18 + H2*U17 + H3*U16 + H4*U15 + H5*U14 + H6*U13 + H7*U12$ $Y13 := H0*U20 + H1*U19 + H2*U18 + H3*U17 + H4*U16 + H5*U15 + H6*U14 + H7*U13$ $Y14 := H0*U21 + H1*U20 + H2*U19 + H3*U18 + H4*U17 + H5*U16 + H6*U15 + H7*U14$ $Y15 := H0*U22 + H1*U21 + H2*U20 + H3*U19 + H4*U18 + H5*U17 + H6*U16 + H7*U15$ $Y16 := H0*U23 + H1*U22 + H2*U21 + H3*U20 + H4*U19 + H5*U18 + H6*U17 + H7*U16$ $Y17 := H0*U24 + H1*U23 + H2*U22 + H3*U21 + H4*U20 + H5*U19 + H6*U18 + H7*U17$ $Y18 := H0*U25 + H1*U24 + H2*U23 + H3*U24 + H4*U21 + H5*U20 + H6*U19 + H7*U18$

The observation matrix A(Gr1), and measurement vector L(Gr1) are as follows:

$$A(Gr1) = \begin{bmatrix} U7, U6, U5, U4, U3, U2, U1, U0 \\ U8, U7, U6, U5, U4, U3, U2, U1 \\ U9, U8, U7, U6, U5, U4, U3, U2 \\ \ldots \\ \ldots \\ U24, U23, U22, U21, U20, U19, U18, U17 \\ U25, U24, U23, U22, U21, U20, U19, U18 \end{bmatrix}$$

$$L(Gr1) = \begin{bmatrix} Y0 \\ Y1 \\ Y2 \\ \ldots \\ \ldots \\ Y17 \\ Y18 \end{bmatrix}$$

$$Y(i+1) = \Sigma(H(k)*U(7+i-k)); \quad k=0 \ldots 7; \quad i=0 \ldots 18; \quad \text{group 2:}$$

The group 2 expression also yields 19 equations, which are omitted here for brevity.

The observation matrix A(Gr2), and measurement vector L(Gr2) are as follows:

$$A(Gr2) = \begin{bmatrix} U7, U6, U5, U4, U3, U2, U1, U0 \\ U8, U7, U6, U5, U4, U3, U2, U1 \\ U9, U8, U7, U6, U5, U4, U3, U2 \\ \ldots \\ \ldots \\ U24, U23, U22, U21, U20, U19, U18, U17 \\ U25, U24, U23, U22, U21, U20, U19, U18 \end{bmatrix}$$

$$L(Gr2) = \begin{bmatrix} Y0 \\ Y1 \\ Y2 \\ \ldots \\ \ldots \\ Y17 \\ Y18 \end{bmatrix}$$

For groups 3, 4, 5, 6 and 7 (Gr3, Gr4, Gr5, Gr6 and Gr7 respectively) the equations are as follows:

$Y(i+2)=\Sigma(H(k)*U(7+i-k)); k=0 \ldots 7; i=0 \ldots 18;$    group 3:

$Y(i+3)=\Sigma(H(k)*U(7+i-k)); k=0 \ldots 7; i=0 \ldots 18;$    group 4:

$Y(i+4)=\Sigma(H(k)*U(7+i-k)); k=0 \ldots 7; i=0 \ldots 18;$    group 5:

$Y(i+5)=\Sigma(H(k)*U(7+i-k)); k=0 \ldots 7; i=0 \ldots 18;$    group 6:

$Y(i+6)=\Sigma(H(k)*U(7+i-k)); k=0 \ldots 7; i=0 \ldots 18;$    group 7:

The equations for group 7 are as follows:

$Y6:=H0*U7+H1*U6+H2*U5+H3*U4+H4*U3+H5*U2+H6*U1+H7*U0$ $Y7:=H0*U8+H1*U7+H2*U6+H3*U5+H4*U4+H5*U3+H6*U2+H7*U1$ $Y8:=H0*U9+H1*U8+H2*U7+H3*U6+H4*U5+H5*U4+H6*U3+H7*U2$ $Y9:=H0*U10+H1*U9+H2*U8+H3*U7+H4*U6+H5*U5+H6*U4+H7*U3$ $Y10:=H0*U11+H1*U10+H2*U9+H3*U8+H4*U7+H5*U6+H6*U5+H7*U4$ $Y11:=H0*U12+H1*U11+H2*U10+H3*U9+H4*U8+H5*U7+H6*U6+H7*U5$ $Y12:=H0*U13+H1*U12+H2*U11+H3*U10+H4*U9+H5*U8+H6*U7+H7*U6$ $Y13:=H0*U14+H1*U13+H2*U12+H3*U11+H4*U10+H5*U9+H6*U8+H7*U7$ $Y14:=H0*U15+H1*U14+H2*U13+H3*U12+H4*U11+H5*U10+H6*U9+H7*U8$ $Y15:=H0*U16+H1*U15+H2*U14+H3*U13+H4*U12+H5*U11+H6*U10+H7*U9$ $Y16:=H0*U17+H1*U16+H2*U15+H3*U14+H4*U13+H5*U12+H6*U11+H7*U10$ $Y17:=H0*U18+H1*U17+H2*U16+H3*U15+H4*U14+H5*U13+H6*U12+H7*U11$ $Y18:=H0*U19+H1*U18+H2*U17+H3*U16+H4*U15+H5*U14+H6*U13+H7*U12$ $Y19:=H0*U20+H1*U19+H2*U18+H3*U17+H4*U16+H5*U15+H6*U14+H7*U13$ $Y20=H0*U21+H1*U20+H2*U19+H3*U18+H4*U17+H5*U16+H6*U15+H7*U14$ $Y21:=H0*U22+H1*U21+H2*U20+H3*U19+H4*U18+H5*U17+H6*U16+H7*U15$ $Y22:=H0*U23+H1*U22+H2*U21+H3*U20+H4*U19+H5*U18+H6*U17+H7*U16$ $Y23:=H0*U24+H1*U23+H2*U22+H3*U21+H4*U20+H5*U19+H6*U18+H7*U17$ $Y24:=H0*U25+H1*U24+H2*U23+H3*U24+H4*U21+H5*U20+H6*U19+H7*U18$

For each group, step 420 yields nineteen equations. In each case, the observation matrix remains the same. However, the measurement vector is different for each group.

$$L(Gr3) = \begin{bmatrix} Y2 \\ Y3 \\ Y4 \\ \ldots \\ \ldots \\ Y19 \\ Y20 \end{bmatrix}$$

$$L(Gr4) = \begin{bmatrix} Y3 \\ Y4 \\ Y5 \\ \ldots \\ \ldots \\ Y20 \\ Y21 \end{bmatrix}$$

$$L(Gr5) = \begin{bmatrix} Y4 \\ Y5 \\ Y6 \\ \ldots \\ \ldots \\ Y21 \\ Y22 \end{bmatrix}$$

$$L(Gr6) = \begin{bmatrix} Y5 \\ Y6 \\ Y7 \\ \ldots \\ \ldots \\ Y22 \\ Y23 \end{bmatrix}$$

$$L(Gr7) = \begin{bmatrix} Y6 \\ Y7 \\ Y8 \\ \ldots \\ \ldots \\ Y23 \\ Y24 \end{bmatrix}$$

As described above, the LSE channel estimate for each group is determined (step 430) according to the following equation:

$$H=(A^TA)^{-1}*(A^TL)$$

For the remainder of this specification $A^TA$ will be written as ATA, and $A^TL$ will be written as ATL. In step 430, the terms ATA and ATL are calculated individually, and then inserted into the equation to determine the LSE channel estimate for each group. This is significant because, as will be shown below, the term ATL can be computed in a more computationally efficient manner according to the present invention when it is calculated separately. Note that for each group in this example there are 8 channel taps; therefore, ATL is an 8×1 matrix and ATA is an 8×8 matrix.

The above equations show that the term ATA remains unchanged for all seven groups and, consequently, could be calculated once and revised for each group. However, a similar set of equations shown for the term ATL demonstrates that these equations are different for each group.

For Group 1:

$ATL(Gr1) = (\Sigma(U(7+i)^*Y(i); \ i = 0 \ldots 18))$
$(\Sigma(U(6+i)^*Y(i); \ i = 0 \ldots 18));$
$(\ldots)$
$(\Sigma(U(i)^*Y(i); \ i = 0 \ldots 18))$ which yields the following for i = 0 to 18:

$ATL(Gr1)\_0 = U7^*Y0 + U8^*Y1 + \ldots + U25^*Y18;$ $ATL(Gr1)\_1 = U6^*Y0 + U7^*Y1 + \ldots + U24^*Y18;$ $\ldots$ $ATL(Gr1)\_7 = U0^*Y0 + U1^*Y1 + \ldots + U18^*Y18;$ For Group 2:

$ATL(Gr2) = (\Sigma(U(7+i)^*Y(i+1); \ i = 0 \ldots 18))$
$(\Sigma(U(6+i)^*Y(i+1); \ i = 0 \ldots 18));$
$(\ldots)$
$(\Sigma(U(i)^*Y(i+1); \ i = 0 \ldots 18))$ which yields the following for i = 0 to 18:

$ATL(Gr2)\_0 = U7^*Y1 + U8^*Y2 + \ldots + U25^*Y19;$ $ATL(Gr2)\_1 = U6^*Y1 + U7^*Y2 + \ldots + U24^*Y19;$ $\ldots$ $ATL(Gr2)\_7 = U0^*Y1 + U1^*Y2 + \ldots + U18^*Y19;$ For Group 3:

$ATL(Gr3) = (\Sigma(U(7+i)^*Y(i+2); \ i = 0 \ldots 18))$
$(\Sigma(U(6+i)^*Y(i+2); \ i = 0 \ldots 18));$
$(\ldots)$
$(\Sigma(U(i)^*Y(i+2); \ i = 0 \ldots 18))$ which yields the following for i = 0 to 18:

$ATL(Gr3)\_0 = U7^*Y2 + U8^*Y3 + \ldots + U25^*Y20;$ $ATL(Gr3)\_1 = U6^*Y2 + U7^*Y3 + \ldots + U24^*Y20;$ $\ldots$ $ATL(Gr3)\_7 = U0^*Y2 + U1^*Y3 + \ldots + U18^*Y20;$ For Group 4:

$ATL(Gr4) = (\Sigma(U(7+i)^*Y(i+3); \ i = 0 \ldots 18))$
$(\Sigma(U(6+i)^*Y(i+3); \ i = 0 \ldots 18));$
$(\ldots)$
$(\Sigma(U(i)^*Y(i+3); \ i = 0 \ldots 18))$ which yields the following for i = 0 to 18:

$ATL(Gr4)\_0 = U7^*Y3 + U8^*Y4 + \ldots + U25^*Y21;$ $ATL(Gr4)\_1 = U6^*Y3 + U7^*Y4 + \ldots + U24^*Y21;$ $\ldots$ $ATL(Gr4)\_7 = U0^*Y3 + U1^*Y4 + \ldots + U18^*Y21;$ For Group 5:

$ATL(Gr5) = (\Sigma(U(7+i)^*Y(i+4); \ i = 0 \ldots 18))$
$(\Sigma(U(6+i)^*Y(i+4); \ i = 0 \ldots 18));$
$(\ldots)$
$(\Sigma(U(i)^*Y(i+4); \ i = 0 \ldots 18))$ which yields the following for i = 0 to 18:

$ATL(Gr5)\_0 = U7^*Y4 + U8^*Y5 + \ldots + U25^*Y22;$ $ATL(Gr5)\_1 = U6^*Y4 + U7^*Y5 + \ldots + U24^*Y22;$ $\ldots$ $ATL(Gr5)\_7 = U0^*Y4 + U1^*Y5 + \ldots + U18^*Y22;$ For Group 6:

$ATL(Gr6) = (\Sigma(U(7+i)^*Y(i+5); \ i = 0 \ldots 18))$
$(\Sigma(U(6+i)^*Y(i+5); \ i = 0 \ldots 18));$
$(\ldots)$
$(\Sigma(U(i)^*Y(i+5); \ i = 0 \ldots 18))$ which yields the following for i = 0 to 18:

$ATL(Gr3)\_0 = U7^*Y5 + U8^*Y6 + \ldots + U25^*Y23;$ $ATL(Gr3)\_1 = U6^*Y5 + U7^*Y6 + \ldots + U24^*Y23;$ $\ldots$ $ATL(Gr3)\_7 = U0^*Y5 + U1^*Y6 + \ldots + U18^*Y23;$ For Group 7:

$ATL(Gr7) = (\Sigma(U(7+i)^*Y(i+6); \ i = 0 \ldots 18))$
$(\Sigma(U(6+i)^*Y(i+6); \ i = 0 \ldots 18))$
$(\ldots)$
$(\Sigma(U(i)^*Y(i+6); \ i = 0 \ldots 18))$ which yields the following for i = 0 to 18:

$ATL(Gr7)\_0 = U7^*Y6 + U8^*Y7 + \ldots + U25^*Y24;$ $ATL(Gr7)\_1 = U6^*Y6 + U7^*Y7 + \ldots + U24^*Y24;$ $\ldots$ $ATL(Gr7)\_7 = U0^*Y6 + U1^*Y7 + \ldots + U18^*Y24;$ In calculating the term ATL in the same, straightforward manner for each group, will require 304 "multiply and accumulate (MAC) operations" per group. This number was determined as follows:

8×19×2=304 MACs (Multiply-and-Accumulate)
8 sets of equations (8 channel taps)
19 multiplications per set (U7*Y6+U8*Y7 . . . )
2, because each separate multiplication is actually performed twice, for the real and imaginary components.

However, Applicant has recognized that calculating subsequent ATLs, i.e., for groups 2–7, can be simplified by using the ATL values calculated for the previous group. For example, group 2 can be rewritten in the following manner:

$ATL(Gr2)\_0 = ATL(Gr1)\_1 - U6^*Y0 + U25^*Y19;$ $ATL(Gr2)\_1 = ATL(Gr1)\_2 - U5^*Y0 + U24^*Y19;$ $ATL(Gr2)\_2=ATL(Gr1)\_3-U4^*Y0+U23^*Y19;$

...

$ATL(Gr2)\_6=ATL(Gr1)\_7-U0^*Y0+U19^*Y19;$ $ATL(Gr2)\_7$ has to be fully calculated.

By reusing the ATL calculations in this way, the number of operations associated with calculating the ATL term used in the LSE channel estimate computation is reduced. More specifically, for this example, the number of MACs for calculating ATLs as part of calculating the LSE channel estimate in step 430 for group 2 becomes:

7×2×2+19×2=66 MACs.

Similarly, for group 3:

$ATL(Gr3)\_0=ATL(Gr2)\_1-U6^*Y1+U25^*Y20;$ $ATL(Gr3)\_1=ATL(Gr2)\_2-U5^*Y1+U24^*Y20;$ $ATL(Gr3)\_2=ATL(Gr2)\_3-U4^*Y1+U23^*Y20;$

...

$ATL(Gr3)\_6=ATL(Gr2)\_7-U0^*Y1+U19^*Y20;$ $ATL(Gr3)\_7$ must be fully calculated.

Again, there are 7×2×2+19×2=66 MACs to be calculated for group 3. This reduction in computations also occurs for groups 4, 5, 6, and 7. Thus, the total number of calculations to be made for calculating ATL's for all of the groups in this exemplary embodiment is:

| | |
|---|---|
| group 1: | 304 |
| group 2: | 66 |
| group 3: | 66 |
| group 4: | 66 |
| group 5: | 66 |
| group 6: | 66 |
| group 7: | 66 |
| Total MACs: | 700 |

Compare this total with a straightforward calculation of the LSE, which does not reuse calculations and, therefore, uses 304 MACs for the processing associated with each group, yielding a total of 2128 MACs. Thus, methods according to the present invention yield a savings in the number of MACs calculated of 1428, or 67.1%.

In addition to reducing the complexity associated with calculating the ATL terms (and, thereby the calculations for the LSE channel estimate H for each group), exemplary embodiments of the present invention also contemplate a reduction in the calculations associated with calculating the noise estimate (step 440). The noise estimate can be determined from the following expression:

$$(L-A^*H)^{'*}(L-A^*H)$$

This can be rewritten as:

$$L^{'*}L - L^{'*}A^*H - H^{'*}A^{'*}L + H^{'*}A^{'*}A^*H$$

where:

$X^*$ is the transponate and conjugate of matrix X. Each of the four matrix products above will be real-valued scalars and, therefore, can be transposed and conjugated freely.

Further, $$A^{'*}A^*H = A^{'*}L:$$

and $$A^{'*}L = ATL$$

which was given in the above-established equations for groups 1–7. The noise estimate (referred to below as "estMetric") is then given as:

$$L^{'*}L - H^{'*}A^{'*}L - H^{'*}A^{'*}L + H^{'*}A^{'*}L$$

rewritten as:

$$LTL - HT\_ATL - HT\_ATL + HT\_ATL$$

and thus, $$estMetric = LTL - HT\_ATL$$

For group 1;

$LTL(Gr1) = Y^{*'*}Y0 + Y1^{'*}Y1 + \ldots + Y18^{'*}Y18;$

For group 2;

$LTL(Gr2) = Y1^{'*}Y1 + Y2^{'*}Y2 + \ldots + Y19^{'*}Y19;$

For group 3;

$LTL(Gr3) = Y2^{'*}Y2 + Y3^{'*}Y3 + \ldots + Y19^{'*}Y19;$

...

For group 7:

$LTL(Gr7) = Y6^{'*}Y6 + Y7^{'*}Y7 + \ldots + Y24^{'*}Y24;$

For group 1, the LTL calculation requires 2*19=38 MACs (real-valued parts only). However, for group 2, Applicants have recognized that:

$LTL(Gr2) = LTL(Gr1) - Y0^{'*}Y0 + Y19^{'*}Y19;$

That is, by reusing the LTL calculations from group 1 to group 2, the computations required can be reduced from 38 MACs per group to only 4 MACs for each group after group 1.

This principle also holds for groups 3, 4, 5, 6, and 7. The LTL calculation for group 3 will use the same calculations as group 2, plus an additional 4 MACs, and so on according to this exemplary embodiment. Therefore, the total number of MACs required for all the LTL equations in the computation of the noise estimate are:

group 1: 38
group 2: 4
group 3: 4
group 4: 4
group 5: 4
group 6: 4
group 7: 4
Total: 62 MACs.

The total number of MACs for the HT_ATL calculations in the noise estimate is 128, i.e., 8×8×2. Therefore, the total number of MACs associated with calculating estMetric (LTL and HT_ATL) is 62+128=190 MACs, according to this exemplary embodiment of the present invention. By way of contrast, a straightforward method for calculating estMetric would require 2128 MACs (i.e., 7×19×8×2 MACs).

As an alternative to using the minimal noise criterion for selecting the best 19-group as the synchronization position group in step 450, the greatest signal-to-noise ratio estimate can also be used. The "noise" part of this ratio is the noise estimate (estMetric) calculated above.

The "signal" part of this ratio, here denoted 'estSignal' is:

$$estSignal = (A*H)^* * (A*H)$$
$$= H^* * A^* * A * H$$
$$= H^* * ATL$$
$$= HT\_ATL;$$

Thus, the wanted estimated Signal/Noise ratio, here denoted "est_S_N_ratio", is calculated as:

$$est\_S\_N\_ratio = HT\_ATL/estMetric;$$

In a Digital Signal Processor (DSP) environment, with only integer arithmetic, this division will require some 30 more operations ("cycles"). Assuming that each MAC takes one cycle, implies that about 30 MACs per least-square equation set-up will be needed to select a synchronization group based on a greatest signal-to-noise ratio criterion. However, consider the following setup which further reduces the computations. Assume that:

1) estSignal is set to minimum:
   estSignal=1;
2) estMetric is set to maximum (for a 32 bits Digital Signal Processor):

$$estMetric = (2^{31} - 1);$$

3) estMetric_Tst is determined as above.
4) estSignal_Tst is set according to the formula above:
   estSignal_Tst=HT_ATL;

Then:
As the test:

if $((A/B) > (C/D))$ is equivalent to the test:

if $((A*D) > (B*C))$ (provided that B #0 and D #0)
then, instead of comparing two ratios, this exemplary embodiment can compare two products:

if $((estSignal\_Tst * estMetric) > (estSignal * estMetric\_Tst))$ etc ...

The result of determining the greatest signal-to-noise ratio in this way is that it reduces the computational complexity from about 30 MACs per set-up to about 10 MACs per least-square equation set-up. Thus, the corresponding processing in all set-ups requires:

190+7*10=260 MACs;

where "190" comes from the "estMetric" calculations as above.

To further illustrate how the present invention can be implemented, some exemplary pseudo code is provided below. Therein, the following notation and assumptions are employed.

1. A digital communication channel is assumed to have N channel taps (e.g. N=8) which means that the energy of one transmitted complex-valued symbol is dispersed during the time duration of N symbols at the receiver, 2. a known training sequence vector of K complex-valued elements (e.g., K=26 in the GSM case), named U(0) ... U(K−1), and which training sequence vector shall be sent out by a transmitter with a fixed symbol rate, 3. a suite of M possible consecutive synchronization positions are considered, which positions shall be spaced in time in the same way as for the known training sequence vector (e.g., M=7), 4. a measured sequence vector of (K−N+M) complex-valued elements is generated, named Y(0) ... Y(K−N+M−1), which elements shall be spaced in time in the same way as for the known training sequence vector, 5. the measured sequence vector in item 4 is measured during such a time interval that it contains most of the received energy corresponding to the known training sequence vector.

Then, exemplary embodiments of the present invention which select a synchronization group based on a least estimated noise criterion is given by:

```
a)  setting up an observation matrix A, with (K−N+1)
    rows and N columns, and with elements A(j,k):
        A(j,k) = U(N+j−k−1),
              for j=0..(K−N) and K = 1..(N−1),
b)  determining the inverse of the so called Normal
    Equation matrix, a N*N matrix:
        ATA_1 = (A*A)^−1,
c)  setting:
        estMetric = 2147483647;      // Maximum (2^31 − 1).
                                     // Valid in a 32 bits
                                     // Digital Signal
                                     // Processor (Integer
                                     // arithmetic only).
d)  testing all M possible consecutive synchronization positions:
    for i = 0..M−1
        L = Y(i)..Y(i+K−N);          // L a column vector
                                     // of (K−N+1) elements.
        if ( i == 0 )
            ATL = A* * L;            // ATL a column vector
                                     // of N elements.
            LTL = L* * L;            // LTL a real-valued
                                     //   scalar.
        else     // i > 0;
            for j = 0..N−2
                ATL(j) = ATL(j+1) − U* (N−2−j)*Y(i−1) +
                              +U* (K−1−j)*Y(K−1−i);
            end;  // for j = 0..N−2
            ATL(N−1) = U* * L;
            LTL = LTL − Y(i−1)* *Y(i−1) +
                         Y(i+K−N)* *Y(i+K−N);
        endif;   // ( i == 0 )
        H_Tst = ATA_1 * ATL;         // H_Tst a column vector
                                     // of N elements.
        HT_ATL = H_Tst* * ATL;
                                     // HT_ATL a real-valued
                                     // scalar.
        estMetric_Tst = LTL − HT_ATL;
                                     // estMetric_Tst a real-
                                     // valued scalar.
        if ( estMetric_Tst < estMetric )
            estMetric = estMetric_Tst;
            H = H_Tst;
            estSyncPos = i;
        endif;   // estMetric_Tst < estMetric
    end;    // for i = 0..M−1
```

Alternatively, pseudo code for implementing an exemplary embodiment of the present invention wherein a greatest estimated signal-to-noise ratio is used as the criterion for selecting a synchronization group is given by:

a) setting up an observation matrix A, with (K−N+1) rows and N columns, and with elements A(j,k):
   A(j,k) = U(N+j−k−1),
   for j=0..(K−N) and K = 1..(N−1),
b) determining the inverse of the so called Normal Equation matrix, a N*N matrix:
   ATA_1 = (A*A)$^{−1}$,
c) setting:
   estSignal =           1'        // Minimum.
   estMetric = 2147483647;         // Maximum (2^31 − 1).
d) testing all M possible consecutive synchronization positions:
   for i = 0..M−1
     L = Y(i)..Y(i+K−N);           // L a column vector
                                   // of (K−N+1) elements.
     if ( i == 0 )
       ATL = A* * L;               // ATL a column vector
                                   // of N elements.
       LTL = L* * L;               // LTL a real-valued
                                   // scalar.
     else       // i > 0;
       for j = 0..N−2
         ATL(j) = ATL(j+1) − U* (N−2−j)*Y(i−1) +
                  +U* (K−1−j)*Y(K−1−i);
       end;    // for j = 0..N−2
       ATL(N−1) = U* * L;
       LTL = LTL − Y(i−1)* *Y(i−1) +
             Y(i+K−N)* *Y(i+K−N);
     endif;   // ( i == 0 )
     H_Tst = ATA_1 * ATL;          // H_Tst a column vector
                                   // of N elements.
     HT_ATL = H_Tst* * ATL;
                                   // HT_ATL a real-valued
                                   // scalar.
     estMetric_Tst = LTL − HT_ATL;
                                   // estMetric_Tst a real-
                                   / valued scalar.
     estSignal_Tst = HT_ATL;
     if ( (estSignal_Tst*estMetric) >
         (estSignal *estMetric_Tst))
       estSignal = estSignal_Tst;
       estMetric = estMetric_Tst;
       H = H_Tst;
       estSyncPos = i;
     endif;     // (estSignal_Tst,*estMetric) > . . .
   end;     // for i = 0..M−1

The present invention thus lies not only in the new and improved method for jointly determining the synchronization group, noise estimate and channel estimate, but also in that the number of calculations needed to determine the factors described above has been reduced by at least 72% over straightforward methods.

The embodiments described above are merely given as examples and it should be understood that the invention is not limited thereto. It is of course possible to embody the invention in specific forms other than those described without departing from the spirit of the invention. Further modifications and improvements which retain the basic underlying principles disclosed and claimed herein, are within the spirit and scope of this invention.

What is claimed is:

1. A method for synchronizing to a radio signal comprising the steps of:
   creating a plurality of groups of sequential symbol values from said radio signal;
   establishing, for each of said plurality of groups, a set of linear equations associated therewith;
   determining a least square estimate for each of said plurality of groups using said respective set of linear equations by calculating a first value of a first term directly for a first of said plurality of groups and a second value of said first term indirectly by using said first value to arrive at said second value; and
   synchronizing to said radio signal by selecting one of said groups based on said determined least square estimates.

2. The method of claim 1, wherein said step of determining a least square estimate (H) further comprises the step of evaluating:
   $H=(A^TA)^{−1}*A^TL$, where A is an observation matrix, L is a column vector of receiver measurements and the superscript $T$ denotes the transpose operation.

3. The method of claim 2, wherein said first term is $A^TL$.

4. The method of claim 2, wherein said terms $A_TA$ and $A^TL$ are calculated separately and employed in the equation $H=(A^TA)^{−1}*A^TL$ to determine said least square estimate.

5. The method of claim 1, further comprising the steps of:
   determining a noise estimate for each group using said respective least square estimate;
   selecting said one of said groups that has the lowest noise estimate.

6. The method of claim 5, wherein said step of determining a noise estimate involves calculating a first value of a second term directly for a first of said plurality of groups and a second value of said second term indirectly by using said first value to arrive at said second value.

7. The method of claim 6, wherein said step of determining a noise estimate further comprises evaluating:
   $(L−A*H)^**(L−A*H)$, where A is an observation matrix, L is a column vector of receiver measurements and H is said least square estimate and wherein said second term is $L^TL$ wherein the superscript $T$ denotes the transpose operation.

8. The method of claim 1, further comprising the steps of:
   determining a noise estimate for each group using said respective least square estimate;
   selecting said one of said groups that has a greatest signal-to-noise ratio.

9. The method of claim 8, wherein said step of determining a noise estimate involves calculating a first value of a second term directly for a first of said plurality of groups and a second value of said second term indirectly by using said first value to arrive at said second value.

10. The method of claim 9, wherein said step of determining a noise estimate further comprises evaluating:
    $(L−A*H)^**(L−A*H)$, where A is an observation matrix, L is a column vector of receiver measurements and H is said least square estimate and wherein said second term is $L^TL$ wherein the superscript $T$ denotes the transpose operation.

11. A method for synchronizing to a radio signal comprising the steps of:
    creating a plurality of groups of sequential symbol values from said radio signal;
    establishing, for each of said plurality of groups, a set of linear equations associated therewith;
    determining a least square estimate for each of said plurality of groups using said respective set of linear equations;
    determining a noise estimate for each of said plurality of groups by calculating a first value of a first term directly for a first of said plurality of groups and a second value of said first term indirectly by using said first value to arrive at said second value; and
    synchronizing to said radio signal by selecting one of said groups based on said determined noise estimates.

12. The method of claim 11, further comprising the steps of:
    determining the noise estimate for each group using said respective least square estimate;

selecting said one of said groups that has the lowest noise estimate.

13. The method of claim 12, wherein said step of determining a noise estimate further comprises evaluating:

$(L-A*H)^**(L-A*H)$, where A is an observation matrix, L is a column vector of receiver measurements and H is said least square estimate and wherein said first term is $L^T L$ wherein the superscript $T$ denotes the transpose operation.

14. The method of claim 11, further comprising the steps of:

determining the noise estimate for each group using said respective least square estimate;

selecting said one of said groups that has the greatest signal-to-noise ratio.

15. The method of claim 14, wherein said step of determining a noise estimate further comprises evaluating:

$(L-A*H)^**(L-A*H)$, where A is an observation matrix, L is a column vector of receiver measurements and H is said least square estimate and wherein said first term is $L^T L$ wherein the superscript $T$ denotes the transpose operation.

16. The method of claim 11, wherein said step of determining a least square estimate further comprises the step of:

determining the least square estimate for each of said plurality of groups using said respective set of linear equations by calculating a first value of a second term directly for a first of said plurality of groups and a second value of said second term indirectly by using said first value to arrive at said second value.

17. The method of claim 16, wherein said step of determining a least square estimate (H) further comprises the step of evaluating:

$H=(A^T A)^{-1}*A^T L$, where A is an observation matrix, L is a column vector of receiver measurements and the superscript $T$ denotes the transpose operation.

18. The method of claim 17, wherein said first term is $A^T L$.

19. The method of claim 17, wherein said terms $A^T A$ and $A^T L$ are calculated separately and employed in the equation $H=(A^T A)^{-1}*A^T L$ to determine said least square estimate.

* * * * *